Figure 1:
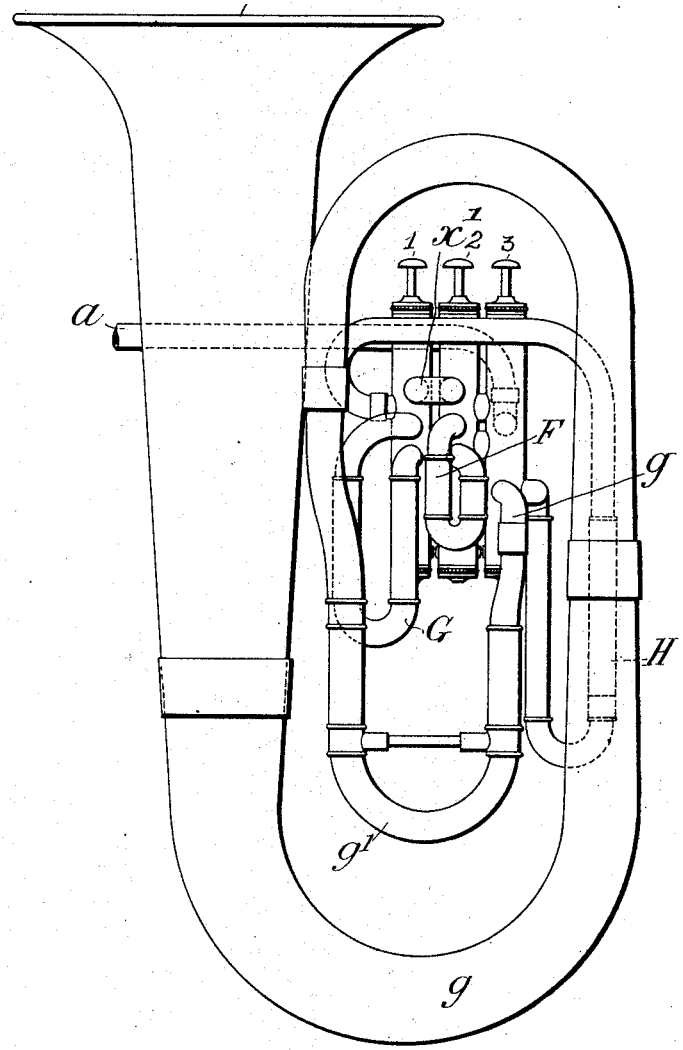

No. 886,783. PATENTED MAY 5, 1908.
T. C. EDWARDS.
CORNET OR THE LIKE.
APPLICATION FILED APR. 29, 1904.

7 SHEETS—SHEET 1.

WITNESSES:

INVENTOR
Thomas C. Edwards
BY
ATTORNEYS.

No. 886,783. PATENTED MAY 5, 1908.
T. C. EDWARDS.
CORNET OR THE LIKE.
APPLICATION FILED APR. 29, 1904.
7 SHEETS—SHEET 2.
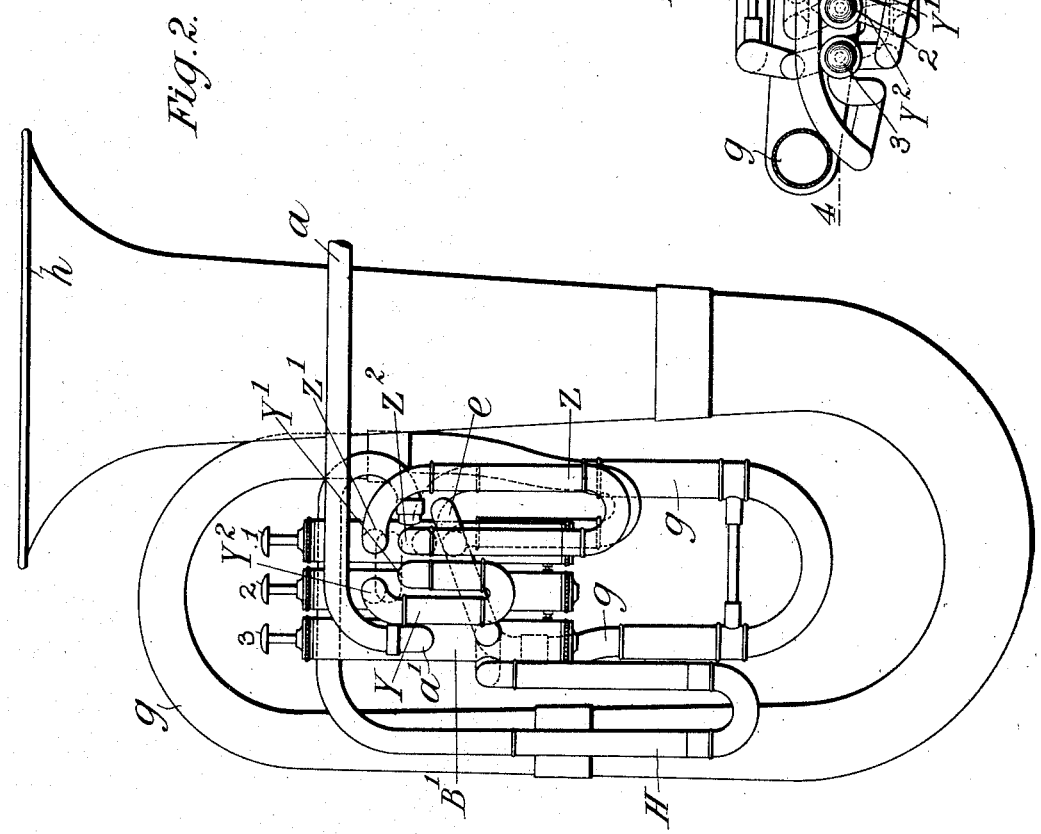
WITNESSES:
INVENTOR
Thomas C. Edwards
BY
ATTORNEYS.

No. 886,783. PATENTED MAY 5, 1908.
T. C. EDWARDS.
CORNET OR THE LIKE.
APPLICATION FILED APR. 29, 1904.

7 SHEETS—SHEET 3.

WITNESSES:

INVENTOR
Thomas C. Edwards
BY
ATTORNEYS.

No. 886,783.       PATENTED MAY 5, 1908.
T. C. EDWARDS.
CORNET OR THE LIKE.
APPLICATION FILED APR. 29, 1904.
7 SHEETS—SHEET 4.
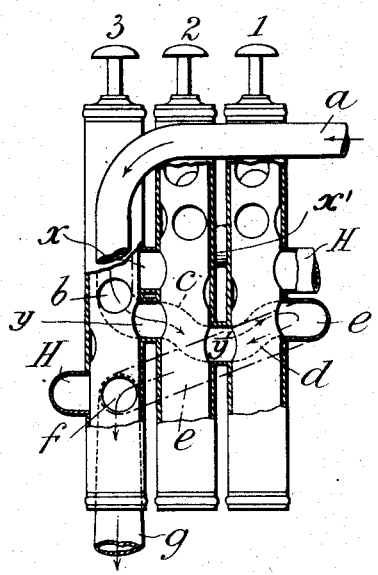
Fig. 5.
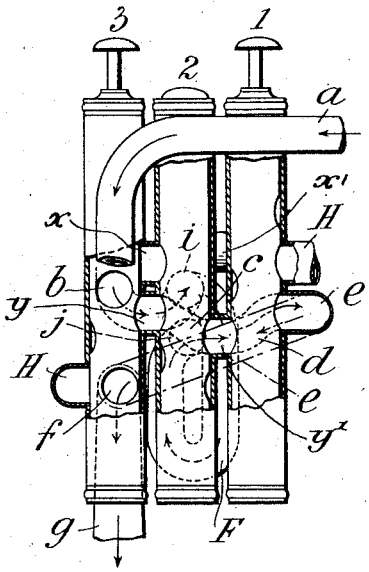
Fig. 6.
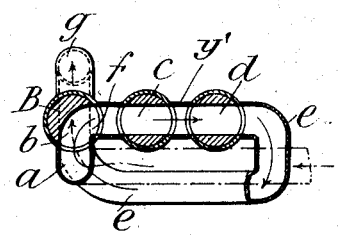
Fig. 5.ª
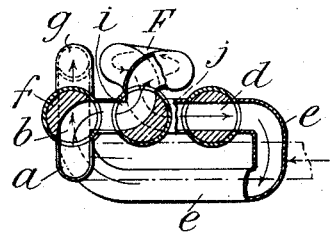
Fig. 6.ª
WITNESSES:
Henry J. Suhrbier
W. E. Rockwell
INVENTOR
Thomas C. Edwards
BY James Niles
ATTORNEYS.

No. 886,783. PATENTED MAY 5, 1908.
T. C. EDWARDS.
CORNET OR THE LIKE.
APPLICATION FILED APR. 29, 1904.
7 SHEETS—SHEET 5.
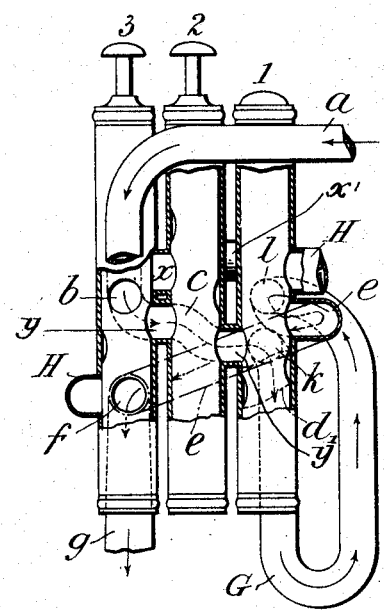
Fig. 7.
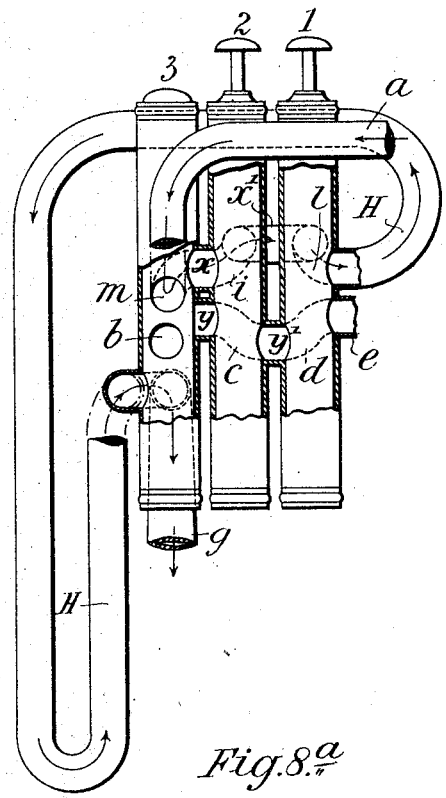
Fig. 8.
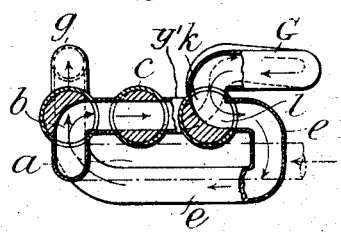
Fig. 7.ª
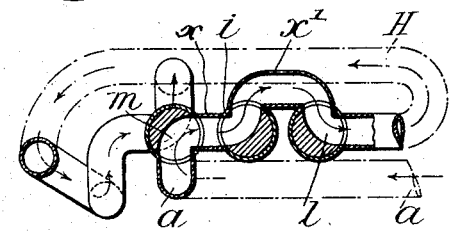
Fig. 8.ª
WITNESSES:
Henry J. Suhrbier.
W. E. Rockwell.
INVENTOR
Thomas C. Edwards
BY Gomez Niles
ATTORNEYS.

No. 886,783. PATENTED MAY 5, 1908.
T. C. EDWARDS.
CORNET OR THE LIKE.
APPLICATION FILED APR. 29, 1904.
7 SHEETS—SHEET 6.
Fig. 9.
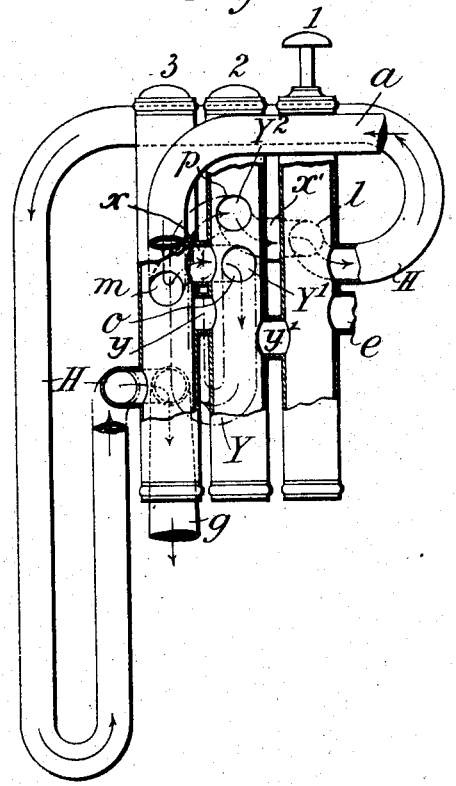
Fig. 10.
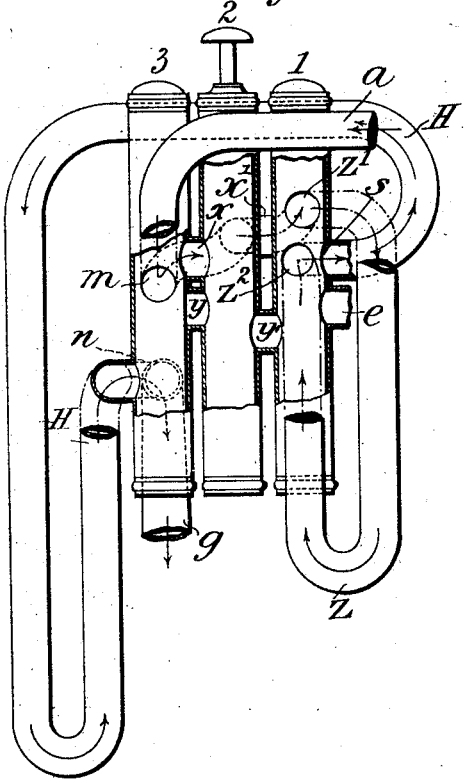
Fig. 9ª.
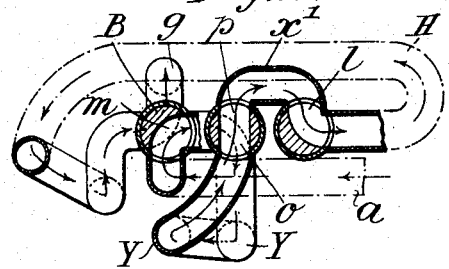
Fig. 10ª.
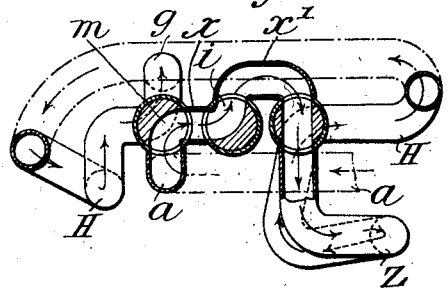
WITNESSES:
INVENTOR
Thomas C. Edwards
BY
ATTORNEYS.

No. 886,783. PATENTED MAY 5, 1908.
T. C. EDWARDS.
CORNET OR THE LIKE.
APPLICATION FILED APR. 29, 1904.
7 SHEETS—SHEET 7.
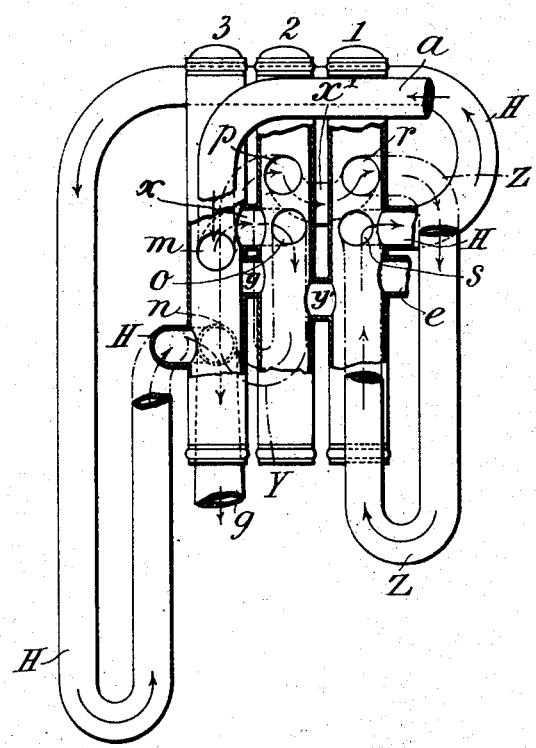
Fig. 11.
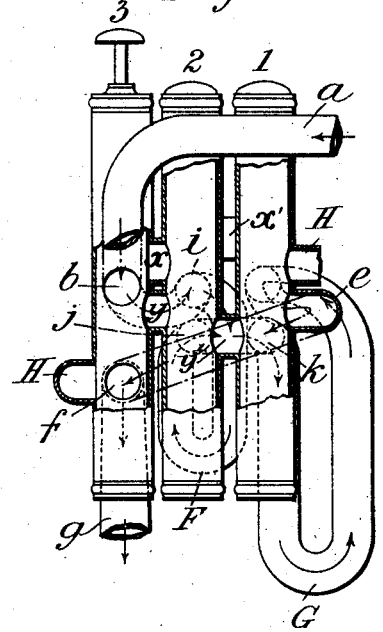
Fig. 12.
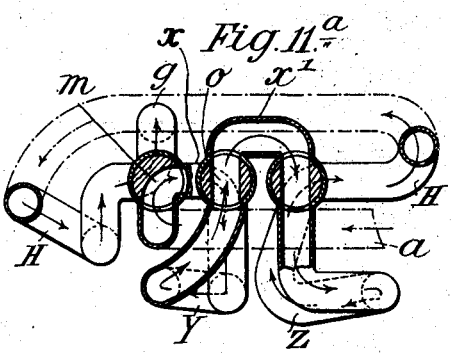
Fig. 11.ᵃ
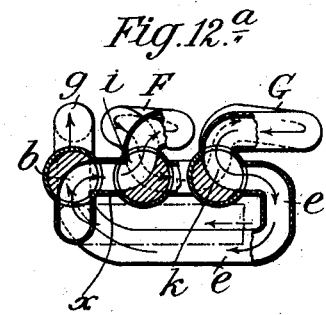
Fig. 12.ᵃ
WITNESSES:
INVENTOR
Thomas C. Edwards
BY
ATTORNEYS.

UNITED STATES PATENT OFFICE.

THOMAS C. EDWARDS, OF LONDON, ENGLAND, ASSIGNOR TO BESSON AND COMPANY, LIMITED, OF LONDON, ENGLAND, A CORPORATION.

CORNET OR THE LIKE.

No. 886,783.  Specification of Letters Patent.  Patented May 5, 1908.

Application filed April 29, 1904. Serial No. 205,454.

*To all whom it may concern:*

Be it known that I, THOMAS CHRISTMAS EDWARDS, a subject of the King of Great Britain, residing in London, England, have invented certain new and useful Improvements in Cornets or the Like, of which the following is a specification.

This invention is primarily designed for the purpose of rectifying errors in wind musical instruments, such as cornets and the like, which have various additional lengths of tubing brought into operation by means of pistons or valves in order to produce various tones. In such instruments the normal (or shortest) length of tubing communicates with all the pistons or valves, which latter are adapted to connect said length of tubing with one or more loop tubes of varying lengths; and these, when the pistons are depressed, consequently become added to the normal tube and so increase its length. Ordinarily these loop tubes are of imperfect length for two or more of them to be used in conjunction, being too short when two or more are brought simultaneously into operation to produce sounds of correct pitch.

This invention aims to obviate the above defects and to provide an instrument which has a comparatively great range of tone and in which the tones are of the correct pitch.

With this end in view, the invention consists in a wind musical instrument which embodies the novel features, arrangements and combinations of parts to be hereinafter described and claimed.

Figure 4:
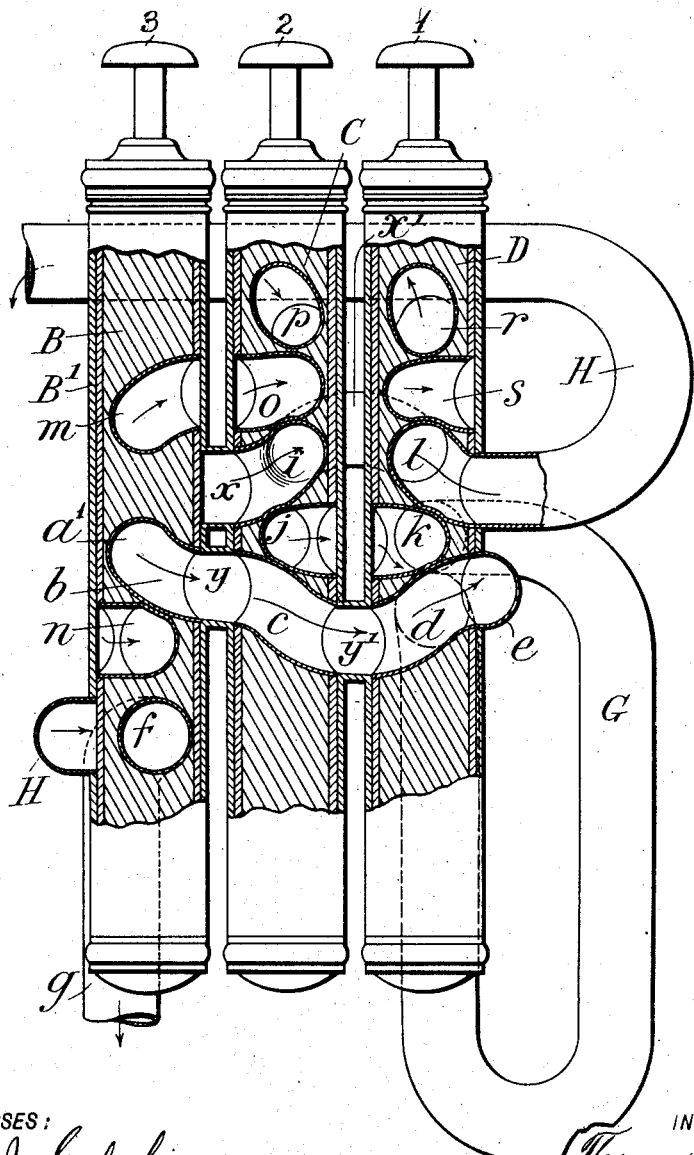

In the accompanying drawings, in which the same reference characters denote the same or corresponding parts throughout the several views, Figure 1 is a side-elevation of an instrument constructed in accordance with the invention, showing the lower loop tubes, Fig. 2 is a view in elevation of the opposite side of the instrument, showing the upper loop tubes, Fig. 3 is a plan of Fig. 2, Fig. 4 is an enlarged vertical sectional view on line 4, 4, Fig. 3, Figs. 5 to 12 are similar sectional views, showing diagrammatically the different passages and their connection in order to produce tones of different pitch, and Figs. $5^a$ to $12^a$ are horizontal cross-sections corresponding respectively to Figs. 5 to 12, as hereinafter explained.

Referring to the drawings, $a$ denotes the inlet to the main tube of the instrument, which inlet leads to the third valve or piston B, the casing $B^1$ of which it enters at $a^1$. In the normal position of the pistons, as shown in Figs. 1, 2, 4 and 5, the air is led from the tube $a$ through the casing $B^1$ and port $b$ in the piston-valve B, connecting passage $y$ port $c$ in the second piston-valve C, connecting passage $y^1$ port $d$ in the first piston-valve D, and thence into the return-loop $e$, through which it is led back to the port $f$ in the piston B and emerges from the piston-valve B into the main tube $g$. The air is conducted through the continuation of this tube $g$ to the bell $h$.

Fig. 5 and Fig. $5^a$ show in diagrammatic form the normal air-passage through the instrument, this position of the valves being known as the "first position". If now the second piston C be depressed, *i. e.* in the "second position", as shown in diagrammatic form in Figs. 6 and $6^a$, the port $c$ is moved down and disconnected and the port $i$ in the piston C connected with the port $b$, thus leading into the shortest lower loop tube F (Fig. 1) from which latter the passage is continued through the port $j$ in the piston C, through the port $d$ and return-loop $e$ as before, to the main tubing $g$ and thence to the bell $h$; the said ordinary loop F to lower the pitch one semitone being thus put in connection, as usual. If now the first piston D alone be depressed, *i. e.* in the "third position", as shown in Fig. 7 and Fig. $7^a$, thereby the port $d$ will be moved down and disconnected and the port $k$ is moved down opposite the passage $y$ from the port $c$. This causes the air to be led through the connecting passage $y^1$ and lower loop-tube G from which the air is led through the port $l$ into the return-loop $e$ and then into the main tube $g$ and bell $h$ as before, thus adding the second loop G to the main tubing to lower the pitch two semitones as usual.

When the third piston B alone is depressed, *i. e.* in the "fourth position", as shown in diagrammatic form in Fig. 8 and Fig. $8^a$, the port $b$ in said piston B will be moved down and disconnected and thereby the lower air-passage through the ports $b$, $c$ and $d$ and return-loop $e$ is entirely cut off—the air-passage from the tube $a$ to the piston B now leads through the port $m$ in said piston B and thence through the connecting tube $x$ the port $i$ in the piston C and the short bend $x^1$ to the port $l$ in the piston D which leads into the longest loop tube H. This latter tube terminates in the valve-casing $B^1$ at a point opposite the opening through the valve-casing $B^1$ leading into the main tube $g$. Said tube H and the main tube $g$ are now put in connection through the port $n$ in the piston B when the latter is depressed. Thus the length of the loop tube H is added to the main tubing by the depression of the valve B, this additional tube H being made of sufficient length to correctly lower the pitch three semitones below that of the normal tube.

In the "fifth position", with the pistons B and C both depressed together, as shown in Fig. 9 and Fig. 9$^a$, the air in the tube $a$ is led, by means of the upper air-passage $x$, through the port $m$ in the piston B into the port $o$ in the piston C, which port $o$ in the piston C leads at $Y^1$ into the shorter upper loop tubing Y (i. e. the smaller additional loop tube), the termination $Y^2$ of which loop tube Y communicates through the port $p^1$ in the piston C and the connecting tube $x^1$ with the port $l$ and loop tube H and port $n$ through which the air is led to the main tube $g$. The length of both the loop tube H and loop tube Y (which is of somewhat greater length than the loop tube F) is thus added to the main tube so as to correctly lower the pitch four semitones below that of the normal tube.

In the next position, i. e. the "sixth position", with the pistons B and D depressed together, as shown in diagrammatic form in Fig. 10 and Fig. 10$^a$, the passage is made from the tube $a$, through the port $m$ in the piston B, and connecting tube $x$ thence through the port $i$ in the piston C (which latter is not depressed) and the connecting tube $x^1$ to the port $r$ in the piston D. The port $r$, with the piston D in this depressed position, communicates at $Z^1$ with the upper loop tube Z, which latter at its end $Z^2$ leads the air through the port $s$ in the now-depressed piston D directly into the loop tube H, and thence through the port $n$ to the main tube $g$ and bell $h$, thus adding to the main tube the length of both the loop tube H and the additional loop tube Z. The latter is of somewhat greater length than the loop tube G so as to correctly lower the pitch five semitones below that of the normal tube.

In the next position, that is, in the "seventh position", where all three pistons are depressed, as shown in Fig. 11 and Fig. 11$^a$, the passage is made from the tube $a$ through the port $m$ in the piston B, connecting tube $x$ the port $o$ in the piston C, and upper loop tube Y, back to the port $p$ in the piston C, and thence through connecting tube $x^1$ to the port $r$, through the upper loop tube Z back to the port $s$ in the piston D and thence to the loop tube H, through the port $n$ in the piston B to the main tube $g$ and bell $h$, thus adding all three loops Y, G and H to the normal tube to thereby correctly lower the pitch six semitones.

Fig. 12 and Fig. 12$^a$ show diagrammatically the first and second pistons depressed, while the third piston is in normal position, thus representing an alternative "fourth position", in which case the passage is through the tube $a$, lower the port $b$ in the third piston B, and connecting tube $y$ thence through the port $i$ and lower loop tube F back to the port $j$, thence through the connecting tube $y^1$ and the port $k$ in the valve D round the lower loop tube G, back to the return-loop $e$, through which it leads to the port $f$ in the piston B and emerges from the piston B into the main tube $g$, and thence through the continuation of this tube $g$ to the bell $h$.

For tuning in the first position, the part $g^1$ of the main tube $g$ may be arranged as a slide for tuning purposes, as usual; or if desired the return-tube $e$ may be provided with or formed as a slide for the purpose of such tuning.

If desired an extra valve or valves may be provided for still further lowering the pitch of the instrument in any known or suitable manner, such additional valve or valves being arranged in suchwise or in such parts of the main tubing as not to interfere with the valve system and upper and lower loop tubes, etc., as hereinbefore described with respect to and as illustrated in the drawings.

Having thus described my invention, I claim as new and desire to secure by Letters Patent:

1. In a cornet or the like, the combination, with three valve-casings, pistons therein having ports, and a mouth-pipe and bell-pipe both connected directly with the casing of the third piston, of tubes connecting said three casings, ordinary loop tubes carried by the first and second casings and communicating respectively with said connecting tubes when the first or second piston is depressed, a return-loop from the first to the third casing, other tubes connecting said casings, loop tubes carried by the first and second casings respectively alternative to the first-named loop tubes and communicating with said last-named connecting tubes when said first or second piston is depressed, the diversion of the air through either the first or last-named connecting tubes being determined by the position of the third piston, and a loop tube leading from the first valve-casing to the third and controlled by the third piston, and normally communicating through the first piston with the last-named connecting tubes.

2. In a cornet or the like, the combination, with three valve-casings, pistons therein having ports, and a mouth-pipe and bell-pipe both communicating directly with the casing of the third piston, of lower tubes $y$ $y^1$ connecting the valve-casings, lower loop tubes carried by the first and second casings and communicating respectively with said lower tubes when the first or second of said pistons is depressed, a return-loop $e$ to lead the air from the first to the third casing after passing through said tubes $y\ y^1$ and second piston in the opposite direction, upper tubes $x\ x^1$ connecting the three valve-casings, upper loop tubes carried by the first and second casings, said upper loop tubes being respectively alternative to the aforesaid lower loop tubes and communicating with said tubes $x\ x^1$ when said pistons are depressed, the diversion of the air through said upper tubes $x\ x^1$ being effected by the depression of the third piston, and a loop tube leading from the casing of the first piston to that of the third piston and controlled by the third piston, and normally in communication through the first piston with the upper tubes $x\ x^1$.

In witness whereof I have hereunto set my hand in presence of two witnesses.

T. C. EDWARDS.

Witnesses:
 HENRY BIRKBECK,
 H. D. JAMESON.